(12) United States Patent
Govyadinov et al.

(10) Patent No.: US 11,209,102 B2
(45) Date of Patent: Dec. 28, 2021

(54) MICROFLUIDIC VALVE

(71) Applicant: Hewlett-Packard Development Company, L.P., Houston, TX (US)

(72) Inventors: Alexander Govyadinov, Corvallis, OR (US); Erik D. Torniainen, Maple Grove, OR (US); Pavel Kornilovich, Corvallis, OR (US); David P. Markel, Albany, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 345 days.

(21) Appl. No.: 15/111,361

(22) PCT Filed: Jan. 29, 2014

(86) PCT No.: PCT/US2014/013657
§ 371 (c)(1),
(2) Date: Jul. 13, 2016

(87) PCT Pub. No.: WO2015/116068
PCT Pub. Date: Aug. 6, 2015

(65) Prior Publication Data

US 2016/0341337 A1    Nov. 24, 2016

(51) Int. Cl.
*F16K 99/00* (2006.01)
*F04B 19/00* (2006.01)
(Continued)

(52) U.S. Cl.
CPC ........ *F16K 99/0019* (2013.01); *F04B 19/006* (2013.01); *F04B 19/24* (2013.01); *F04B 49/06* (2013.01); *F16K 99/0055* (2013.01)

(58) Field of Classification Search
CPC ........ F04B 19/006; F04B 19/24; F04B 49/06; F16K 99/0019; F16K 99/0055
See application file for complete search history.

(56) References Cited

U.S. PATENT DOCUMENTS 4,795,243 A * 1/1989 Suzuki ................. G02F 1/0147
359/291
5,699,462 A * 12/1997 Fouquet ............... G02B 6/3538
347/1
(Continued)

FOREIGN PATENT DOCUMENTS

CN    102235162    11/2011
EP    2105202    9/2009
(Continued)

OTHER PUBLICATIONS

Bardell, R.L., "The Diodicity Mechanism of Tesla-type No-moving-parts Valves",http://www.microplumbers.com/pubs/BardellRL-PhDDissertation.pdf, (2000).

*Primary Examiner* — Angelisa L. Hicks
(74) *Attorney, Agent, or Firm* — Dicke Billig & Czaja PLLC (57) ABSTRACT

A microfluidic valve comprises a first reservoir, a second reservoir, an inertial pump and a channel connecting the first reservoir to the second reservoir. The second reservoir is to receive fluid from the first reservoir through the channel under a pressure gradient. The inertial pump is within the channel proximate the second reservoir and distant the first reservoir.

20 Claims, 5 Drawing Sheets

(51) Int. Cl.
*F04B 19/24* (2006.01)
*F04B 49/06* (2006.01)

(56) References Cited

U.S. PATENT DOCUMENTS

| | | | |
|---|---|---|---|
| 6,299,673 B1 * | 10/2001 | Field | B41J 2/19 347/92 |
| 6,360,775 B1 * | 3/2002 | Barth | G02B 6/3538 137/803 |
| 6,561,224 B1 | 5/2003 | Cho | |
| 6,755,211 B1 * | 6/2004 | O'Connor | B01L 3/502738 137/315.01 |
| 7,731,910 B2 | 6/2010 | Boyd et al. | |
| 8,382,253 B1 * | 2/2013 | Rivas | B41J 2/14145 347/56 |
| 2004/0189311 A1 * | 9/2004 | Glezer | B01L 3/5027 324/444 |
| 2006/0166357 A1 | 7/2006 | Takayama et al. | |
| 2007/0295655 A1 | 12/2007 | Biermans | |
| 2009/0014360 A1 | 1/2009 | Toner et al. | |
| 2010/0137163 A1 | 6/2010 | Link et al. | |
| 2011/0083964 A1 * | 4/2011 | Ulmanella | G05D 7/0694 204/643 |
| 2011/0286493 A1 * | 11/2011 | Torniainen | B41J 2/1404 374/33 |
| 2012/0152361 A1 | 6/2012 | Williams et al. | |
| 2012/0244604 A1 | 9/2012 | Kornilovich et al. | |
| 2013/0061962 A1 | 3/2013 | Komilovich et al. | |
| 2013/0202278 A1 * | 8/2013 | Hong | F04B 19/006 392/471 |
| 2013/0295655 A1 | 11/2013 | Imran | |

FOREIGN PATENT DOCUMENTS

| | | | | |
|---|---|---|---|---|
| EP | 2217379 | 8/2010 | | |
| JP | 2000-274375 A | 10/2000 | | |
| JP | 2013-533101 A | 8/2013 | | |
| JP | 2019-533102 A | 8/2013 | | |
| WO | WO-0222250 | 3/2002 | | |
| WO | WO-03008102 | 1/2003 | | |
| WO | WO-2009118689 | 10/2009 | | |
| WO | WO-2011146145 | 11/2011 | | |
| WO | WO-2011146145 A1 * | 11/2011 | | B41J 2/1753 |
| WO | WO-2012091677 | 7/2012 | | |

* cited by examiner

MICROFLUIDIC VALVE

CROSS-REFERENCE TO RELATED APPLICATION

This application is a U.S. National Stage Application of and claims priority to International Patent Application No. PCT/US2014/013657, filed on Jan. 29, 2014, and entitled "MICROFLUIDIC VALVE," which is hereby incorporated by reference in its entirety.

BACKGROUND

Valves are used to minimize or eliminate flow of fluid in a specified direction. Valves in microfluidic systems often require specific materials that may be expensive, difficult to manufacture or that have limited material compatibility. Valves in microfluidic systems often include moving parts, reducing reliability.

DETAILED DESCRIPTION OF THE EXAMPLE EMBODIMENTS

Figure 1:
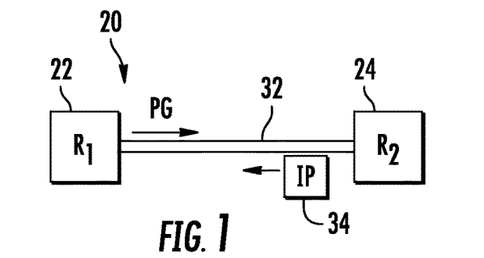
FIG. 1 is a schematic illustration of an example microfluidic valve.

FIG. 1 schematically illustrates an example microfluidic valve 20. As will be described hereafter, a microfluidic valve utilizes an inertial pump to control the flow of fluid under a pressure gradient between reservoirs. In many implementations, microfluidic valve 20 reduces or omits moving parts, has a lower cost and may provide enhanced reliability.

Microfluidic valve 20 comprises reservoir 22, reservoir 24, channel 32 and inertial pump 34. Channel 32 fluidly connects reservoirs 22 and 24. In the example illustrated, a pressure gradient biases fluid within reservoir 22 towards reservoir 24 through channel 32. In one implementation, the pressure gradient is provided by an additional pump (not shown) that, when actuated, applies force to move the fluid from reservoir 22 towards reservoir 24. In another implementation, the pressure gradient may be provided by gravity.

Inertial pump 34 comprises a pumping device located along channel 32 proximate to reservoir 24 and distant to reservoir 22. In other words, inertial pump 34 is spaced from reservoir 24 by a distance less than one half of the length of the total fluid path between reservoirs 22 and 24. Inertial pump 34 utilizes inertia and momentum within a channel that is relatively narrow compared to the two reservoirs it connects to produce fluid flow. For purposes of this disclosure, the term "inertial pump" refers to a pumping device that initially drives fluid in both directions within a channel that is relatively narrow to the reservoirs it connects, but wherein the pumping device is asymmetrically positioned between the reservoirs such that the end result is fluid being driven in a direction towards the most distant of the two reservoirs.

In system 20, inertial pump 34 is selectively actuated to produce fluid flow in a direction to oppose the fluid flow resulting from the pressure gradient so as to control the flow of fluid from reservoir 22 to reservoir 24. In one implementation, inertial pump 34 may be actuated to an extent so as to occlude the flow of fluid from reservoir 22 to reservoir 24. In another implementation, inertial pump 34 may be selectively actuated to control and reduce the rate at which fluid flows under the pressure gradient from reservoir 22 to reservoir 24.

In one implementation, inertial pump 34 comprises a bubble jet pump. A bubble jet pump is a pump that produces an initially expanding bubble to move or drive adjacent fluid away from the bubble. One example of a bubble jet pump comprises a micro-heater, such as a thermal inkjet (TIJ) pump. A TIJ pump utilizes one or more electrical resistors through which electric current is passed. The heat produced by the one or more resistors as electric current passes through the one or more resistors vaporizes fluid that is proximate to the resistors to create a bubble. As this bubble is initially created and expands, the bubble initially drives adjacent fluid away from the bubble.

FIGS. 2(a)-2(f) illustrate operation of an example implementation of system 20 wherein inertial pump 34 comprises a bubble jet pump. FIGS. 2(a)-2(f) illustrate an expansion-collapse cycle of a single actuation of the bubble jet pump, serving as inertial pump 34. The single expansion-collapse cycle results in force being applied to fluid in a direction away from the reservoir 24 that is closest to inertial pump 34 so as to oppose and control fluid flow under the pressure gradient from reservoir 22.

FIG. 2(a) illustrates system 20 in a starting state in which the fluid within channel 32 is at rest. FIG. 2(b) illustrates system 20 upon a single actuation of the bubble jet pump serving as inertial pump 34. As shown by FIG. 2(b), the bubble jet pump generates a high-pressure vapor bubble 36. The bubble provides a positive pressure difference that pushes fluid away from bubble 36 in both directions. As shown by FIG. 2(c) the vapor pressure of bubble 36 quickly drops below atmospheric and the fluid decelerates under a negative pressure difference while continuing to move as a result of inertia. As shown by FIG. 2(d) the fluid in the short arm 38 of channel 32 versus direction or turns around upon reaching the larger interface of reservoir 24. At the same time, the fluid in the larger arm 40 of channel 32 continues to move towards reservoir 22. As shown by FIG. 2(e), the fluid in the long arm 40 moving towards reservoir 22 reaches reservoir 22 and turns around or reverses direction such that the two fluidic columns collide at a collision point shifted from the starting point of the initial expansion, inertial pump 34, towards the reservoir 22 most distant from inertial pump 34. As shown by FIG. 2(f), because the fluid flowing from the shorter arm 38 has a greater amount of momentum at the point of collision, the total post collapse momentum is nonzero with the fluid ultimately being driven in a direction towards reservoir 22 to oppose the fluid being driven under the pressure gradient and to control (occlude or reduce) the flow from reservoir 22 to reservoir 24.

The rate at which fluid is driven by inertial pump 34 is dependent upon the power and speed or "kick" of the inertial pump 34, the distance at which inertial pump 34 is spaced from the most proximate reservoir, the cross-sectional area or width of the reservoir relative to the cross-sectional area or width of channel 32 and the viscosity of the fluid to be pumped. The movement of fluid by inertial pump as a result of inertia is greater than the resistance against such movement due to friction. In one implementation, inertial pump 34 has an initial velocity of at least 1 m/s to 10 m/s and nominally as high as 20 m/s. In one implementation, inertial pump 34 comprises thermal inkjet resistor which produces a vapor bubble that propels adjacent fluid at an initial velocity of at least 1 m/s to 10 m/s. In one implementation, the reservoir proximate to the inertial pump 34, reservoir 24, has a cross-sectional area or width of at least 5 times, and nominally at least 10 times, the cross-sectional area or width of channel 32. In one implementation, channel 32 has a width of 200 μm while reservoir 24 has a width (measured perpendicular to the axial direction of channel 32 at the interface of reservoir 24) of 1 mm. In yet other implementations, the difference in widths of channel 32 and reservoir 24 may have other values.

Figure 2:
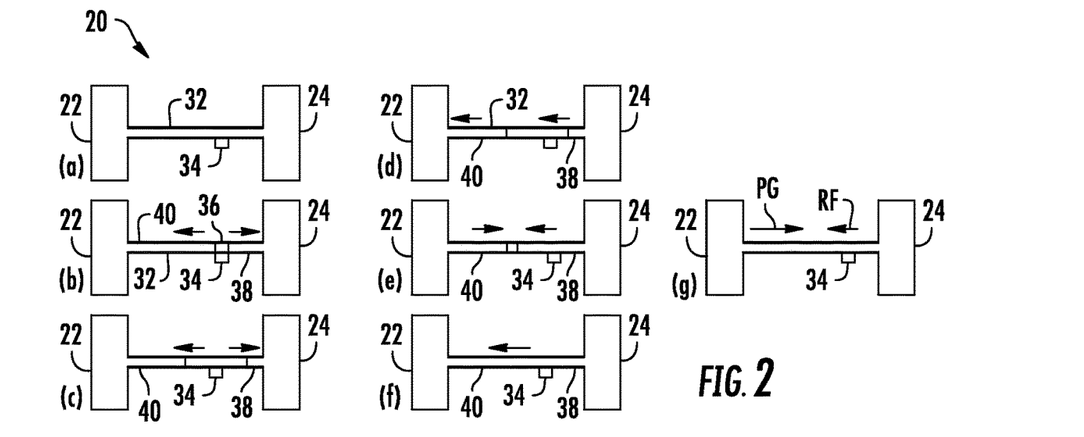
FIGS. 2(a)-2(f) schematically illustrate example operation of an inertial pump of the microfluidic valve of FIG. 1 in the absence of a pressure gradient from a source reservoir.
FIG. 2(g) schematically illustrates the resistant flow produced by the operation of the inertial pump of FIGS. 2(a)-2(f) opposing pressure gradient flow from a source reservoir to serve as a valve.

Although FIG. 2 illustrates an implementation of system 20 wherein inertial pump 34 comprises a bubble jet pump, in other implementations, inertial pump 34 may comprise other pumping mechanisms or devices that initially drive fluid in both directions within a channel that is relatively narrow to the reservoirs it connects, but wherein the pumping device is asymmetrically positioned between the reservoirs such that the end result is fluid being driven in a direction towards the most distant of the two reservoirs. For example, in other implementations, inertial pump 34 may comprise a flexible or deflectable membrane along a side of channel 32 proximate to reservoir 24 and distant reservoir 22, wherein the membrane is deflectable by electrical, magnetic, mechanical or other forces to initially drive fluid in both directions within the relatively narrow channel. In one implementation, inertial pump 34 may comprise a piezo element (PZT) deflectable membrane.

Figure 3:
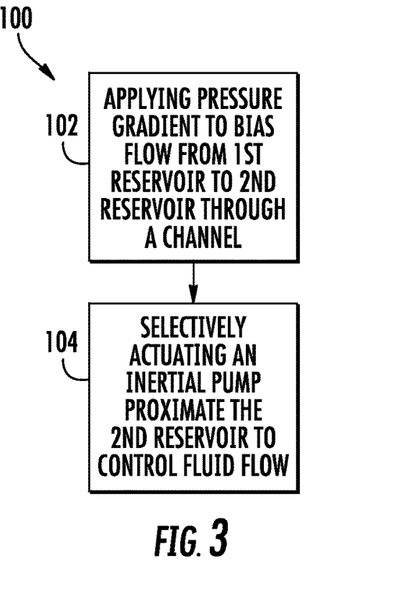
FIG. 3 is a flow diagram of an example method that may be carried out by the microfluidic valve of FIG. 1.

FIG. 3 is a flow diagram illustrating an example method 100 for providing a microfluidic valve to control the flow of fluid under pressure gradient from a first reservoir to a second reservoir. As indicated by step 102, a pressure gradient is applied to fluid to bias fluid flow from the first reservoir to the second reservoir through a channel. In one implementation, the bias of the pressure gradient may be achieved utilizing a pump or may be achieved utilizing gravity or other sources of force. As indicated by step 104, an inertial pump is selectively actuated proximate the second reservoir to selectively apply a fluid flow that counters the pressure gradient so as to control the rate at which fluid flows to the second reservoir under the pressure gradient. In one implementation, the fluid flow produced by the inertial pump is sufficiently large so as to completely counter the pressure gradient and occlude fluid flow to the second reservoir. In another implementation, the fluid flow produced by the inertial pump is less than the fluid flow under the pressure gradient access to controllably reduce the rate at which fluid flows to the second reservoir.

Figure 4:
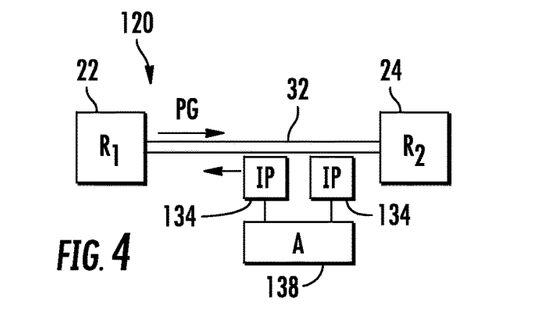
FIG. 4 is a schematic illustration of another example microfluidic valve.

FIG. 4 schematically illustrates microfluidic valve 120, an example implementation of microfluidic valve 20. Microfluidic valve 120 is similar to microfluidic valve 20 except that microfluidic valve 120 additionally comprises inertial pump 134 and actuator 138. Those remaining components of microfluidic valve 120 which correspond to components of microfluidic valve 20 are numbered similarly.

Inertial pump 134 is similar to inertial pump 34 in that inertial pump 134 is located along the channel 32 proximate reservoir 24 and distant reservoir 22. Inertial pump 134 is independently actuatable with respect to inertial pump 34. Actuator 138 comprises a device to selectively actuate either of inertial pumps 34, 134, neither of inertial pumps 34, 134 or both of inertial pumps 34, 134 to control or valve fluid flow under the pressure gradient from reservoir 22 to reservoir 24. In one implementation, actuator 138 comprises an integrated circuit. In another implementation, actuator 138 comprises a processing unit operating under the direction or control of computer-readable instructions contained in a non-transitory computer-readable medium. By selectively and independently actuating inertial pumps 34, 134, actuator 138 controls the force of fluid flow opposing the fluid flowing through channel 32 from reservoir 22 under the pressure gradient.

For purposes of this application, the term "processing unit" shall mean a presently developed or future developed processing unit that executes sequences of instructions contained in a non-transitory memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller actuator 138 may be embodied as part of one or more application-specific integrated circuits (ASICs). Unless otherwise specifically noted, the controller or actuator is not limited to any specific combination of hardware circuitry and software, nor to any particular source for the instructions executed by the processing unit.

In one implementation, inertial pumps 34 and 134 are located at different positions along channel 32 such that one of pumps 34, 134 is closer to reservoir 24 than the other of pumps 34, 134. As a result, given the same pumping force, the inertial pump closest to reservoir 24 produces greater fluid flow opposing the pressure gradient compared to the inertial pump that is farther away from reservoir 24. By selectively actuating either the pump closest to reservoir 24 or the inertial pump farther away from reservoir 24, actuator 138 controls the fluid flow opposing the pressure gradient to control the valve mechanism provided by inertial pumps 34, 134.

In another implementation, inertial pumps 34 and 134 are equidistantly spaced from reservoir 24 but have different pumping forces. For example, inertial pump 34 may initially drive fluid in both directions within channel 32 at a first force or at a first rate while inertial pump 134 may initially drive fluid in both directions within channel 32 at a second force or a second rate greater than the first force or first rate. By selectively actuating either of pumps 34, 134, actuator 138 controls the fluid flow opposing the pressure gradient to control the valve mechanism provided by inertial pumps 34, 134.

In one implementation, pumps 34, 134 may be both differently located along channel 32 relative to reservoir 24 (and reservoir 22) and may both have different pumping forces for enhanced control of fluid flow. Although system 120 is illustrated as comprising two independently actuatable inertial pumps 34, 134, in other implementations, system 120 may include greater than two independently actuatable or controllable inertial pumps to provide a greater degree of control of the degree to which fluid flows under the pressure gradient from reservoir 22 to reservoir 24. In one implementation, one or both of inertial pumps 34, 134 comprise a bubble jet pump. In other implementations, one or both of inertial pumps 34, 134 comprise other types of inertial pumps.

Figure 5:
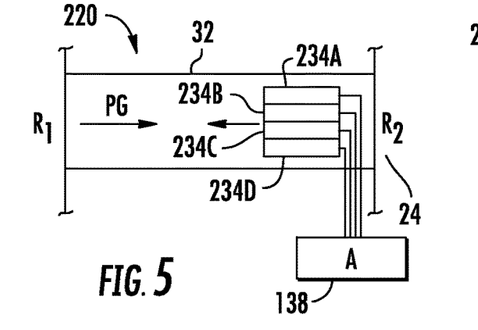
FIG. 5 is a schematic illustration of another example microfluidic valve.

FIG. 5 schematically illustrates microfluidic valve 220, an example implementation of microfluidic valve 20. Microfluidic valve 220 is similar to microfluidic valve 120 except that microfluidic valve 220 is specifically illustrated as comprising inertial pumps 234A, 234B, 234C and 234D (collectively referred to as inertial pumps 234). In the example illustrated, inertial pumps 234 are provided as an array of bubble jet pumps or TIJ thermal resistors within channel 32. Each of inertial pumps 234 is closer to reservoir 24 than reservoir 22. Each of inertial pumps 234 is equally spaced from reservoir 24.

Each of inertial pumps 234 is selectively actuatable by actuator 138. As a result, actuator 138 serves as a valve by controlling fluid flow through channel 32 by selectively actuating one or more of pumps 234 concurrently to vary a number of the inertial pumps 234 (a number of the TIJ resistors) that are concurrently fired to vary a pumping force. For example, to reduce the flow of fluid under the pressure gradient to reservoir 24, actuator 138 may fire inertial inertial pump 234A. To reduce fluid flow under the pressure gradient to reservoir 24 by an even greater extent, actuator 138 may alternatively fire inertial pumps 234A and 234B, concurrently. To reduce fluid flow under the pressure gradient to reservoir 24 by a yet even greater extent, actuator 238 may alternatively concurrently actuate an even greater number of inertial pumps such as by concurrently actuating inertial pumps 234A, 234B and 234D. The array of inertial pumps 234 provide actuator 138 with multiple combinations for incrementally adjusting the degree to which fluid flow under the pressure gradient from reservoir 22 to reservoir 24 is restricted or reduced.

Figure 6:
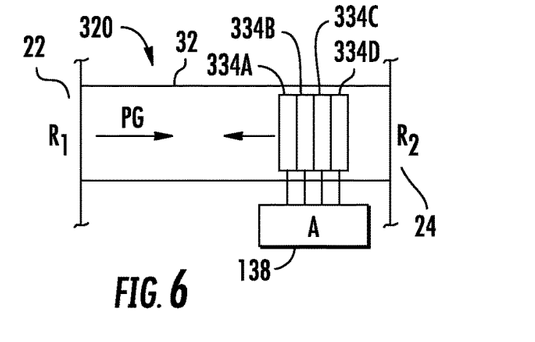
FIG. 6 is a schematic illustration of another example microfluidic valve.

FIG. 6 illustrates microfluidic valve 320, another example implementation of microfluidic valve 20. Microfluidic valve 320 is similar to microfluidic valve 120 except that microfluidic valve 320 is specifically illustrated as comprising inertial pumps 334A, 334B, 334C and 334C (collectively referred to as inertial pumps 334). In the example illustrated, inertial pumps 334 are provided as an array of bubble jet pumps or TIJ thermal resistors along channel 32. Each of inertial pumps 334 is closer to reservoir 24 than reservoir 22. However, each of inertial pumps 334 is differently spaced from reservoir 24. Each of inertial pumps 334 is selectively actuatable by actuator 138. As a result, actuator 138 controls fluid flow through channel 32 by selectively actuating one of pumps 334. To reduce the flow fluid under the pressure gradient to reservoir 24, actuator 138 may fire the TIJ resistive elements of inertial pump 334A. To reduce the flow of fluid under the pressure gradient to reservoir 24 by a greater extent, actuator 138 may alternatively fire inertial pump 334B which is closer to reservoir 24. To reduce flow fluid under the pressure gradient to reservoir 24 by an even greater extent, actuator 138 may alternatively fire inertial pump 334C or inertial pump 334D which are even closer to reservoir 24. As a result, actuator 138 controls and adjusts the degree to which fluid flows under the pressure gradient from reservoir 22 to reservoir 24 by selectively actuating inertial pumps differently spaced from reservoir 24.

In the example illustrated, inertial pumps 334 are additionally configured to be concurrently actuated or fired. As a result, in addition to selectively controlling which of inertial pumps 334 are fired to control the valving based upon the spacing of the selectively fired pump from reservoir 24, actuator 138 may control fluid flow within channel 32 by selectively concurrently actuating two or more of pumps 334 to also vary the pumping force of the array of inertial pumps 334. For example, to reduce fluid flow under the pressure gradient reservoir 24, actuator 138 may fire inertial pump 334D. To reduce fluid flow under the pressure gradient to reservoir 24 by an even greater extent, actuator 138 may alternatively fire pumps 334D and 334A, concurrently. To reduce fluid flow under the pressure gradient to reservoir 24 by an even greater extent, actuator 138 may alternatively fire pumps 334D and 334B, concurrently, wherein the enhanced reduction of fluid flow to reservoir 24 is a result of inertial pump 334B being closer to reservoir 22 as compared to inertial pump 334A. To reduce fluid flow under the pressure gradient to reservoir 24 by a yet even greater extent, actuator 238 may alternatively concurrently actuate an even greater number of inertial pumps such as by concurrently actuating inertial pumps 334D, 334A and 334B. The array of inertial pumps 334 provide actuator 138 with multiple combinations for incrementally adjusting the degree to which fluid flow under the pressure gradient from reservoir 22 to reservoir 24 is restricted or reduced.

Figure 7:
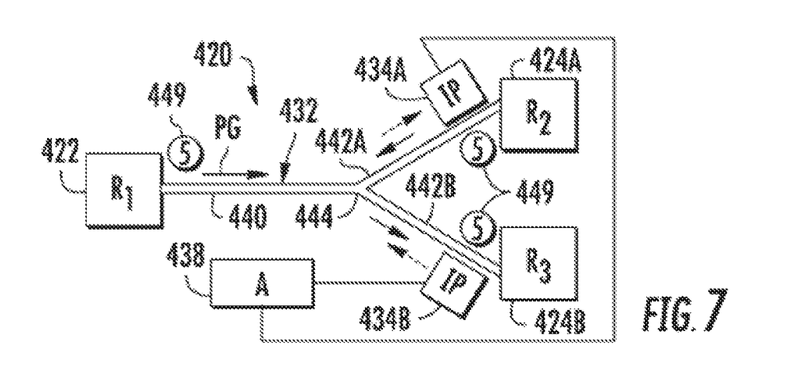
FIG. 7 is a schematic illustration of another microfluidic valve.

FIG. 7 schematically illustrates microfluidic valve 420, another implementation of microfluidic valve 20. Microfluidic valve 420 comprises a valve system for regulating or controlling fluid flow from one or more fluid sources under pressure gradient to two or more different recipient reservoirs. Microfluidic valve 420 comprises source reservoir 422, recipient reservoirs 424A, 424B (collectively referred to as recipient reservoirs 424), channel 432, inertial pumps 434A, 434B (collectively referred to as inertial pumps 434) and actuator 438. Source reservoir 422 is similar to source reservoir 422 of system 20 in that source reservoir 422 of system 420 provides a supply or source of fluid under a pressure gradient so as to flow, in the absence of resistance, towards one or both of recipient reservoirs 424. In one implementation, the pressure gradient under which fluid from reservoir 42 flows may be provided by a pump associated with reservoir 422.

Recipient reservoirs 424 are similar to recipient reservoir 24. Recipient reservoirs 424 selectively receive fluid from source reservoir 422 through channel 432 under the control of the inertial pumps 434 and actuator 438.

Channel 432 is similar to channel 32 in that channel will 432 fluidly connects reservoirs 422 and 424. In the example illustrated, a pressure gradient biases fluid within reservoir 422 towards reservoir 424 through channel 432. Channel 432 comprises branches 440, 442A and 442B (collectively referred to as branches 442). Branch 440 is fluidly connected to reservoir 422, directly or indirectly, and directs the fluid under the pressure gradient towards a juncture or intersection 444 with branches 442. Branch 442A extends from intersection 444 to recipient reservoir 424A. Branch 442B extends from intersection 444 to recipient reservoir 424B. Although branches 442 are illustrated as extending from intersection 444 at the depicted equidistant angles with respect to branch 440, in other implementations, branches 442 may extend from intersection 444 at other angles relative to one another which may or may not be equal.

Inertial pumps 434 are similar to inertial pump 34. Inertial pump 434A is located along branch 442A proximate to reservoir 424A and distant reservoir 422 and distant reservoir 424B. Inertial pump 434B is located along branch 442B proximate to reservoir 424B and distant reservoir 424A. In other words, inertial pumps 434A and 434B are closer to their associated recipient reservoirs 424A and 424B, respectively, than they are to reservoir 422 or the other recipient reservoirs. In one implementation, one or both of inertial pumps 434 comprise bubble jet pumps. In yet other implementations, one or both of inertial pumps 434 may comprise other types of inertial pumps having deflectable membranes such as a PZT pump.

Actuator 438 is similar to actuator 138 described above in that actuator 438 comprises a device to selectively actuate either of inertial pumps 434A, 434B, neither of inertial pumps 434A, 434 B or both of inertial pumps 434A, 434 to control the flow of fluid under the pressure gradient from reservoir 422 to one or both of reservoirs 424. In one implementation, actuator 438 comprises an integrated circuit. In another implementation, actuator 438 comprises a processing unit operating under the direction or control of computer-readable instructions contained in a non-transitory computer-readable medium. By selectively and independently actuating inertial pumps 434, actuator 438 controls the force of fluid flow opposing the fluid flowing through channel 432 from reservoir 422 under the pressure gradient.

In one implementation, actuator 438 may selectively actuate inertial pumps 434 to direct the fluid coming from reservoir 422 to a selected one of reservoirs 424. For example, in one implementation in which fluid flowing through branch 440 in the absence of actuation of pumps 534B and 534C equally splits to branches 442, actuator 438 may actuate inertial pump 434A to produce a rate of fluid flow along branch 442A towards intersection 444 that is ½ of the rate of fluid flow from source reservoir 422 under the pressure gradient. In such an implementation, the fluid from source reservoir 422 flows to recipient reservoir 424B. In contrast, in another implementation in which fluid flowing through branch 440, in the absence of actuation of pumps 434, equally splits to branches 442, actuator 438 may actuate inertial pump 434B to produce at a rate of fluid flow along branch 442B towards intersection 444 that is ½ of the rate of fluid flow from source reservoir 422 under the pressure gradient. In such an implementation, the fluid from source reservoir 422 flows to recipient reservoir 424A. In some implementations, in the absence of the operation of either pumps 434, the fluid flowing through branch 440 may not equally split between channels 442, such as if channels 442 are of different sizes and/or the angles at intersection 444 are not equal. In such circumstances, inertial pumps 434, when actuated, may produce a rate of fluid flow towards intersection 444 that is greater than or less than one half of the rate of fluid flow from source reservoir 422 depending upon such unequal flow characteristics from branch 440. In yet another implementation, actuator 438 may actuate both pumps 434 to occlude or block fluid flow to either of reservoirs 424A, 424B.

In one implementation, system 420 may comprise additional inertial pumps along one or both of branches 442 as described above with respect to system 220 or system 320. In such an implementation, by selectively actuating different combinations of multiple inertial pumps, actuator 438 selectively and incrementally controls the percentage of fluid flow from reservoir 422 that flows to each of reservoirs 424. For example, in implementations in which branches 442 each include an array of inertial pumps such as the array of the inertial pumps 234A-234D shown and described above with respect to system 220, actuator 438 may selectively actuate different numbers of the inertial pumps to vary pumping force to incrementally adjust the percentage a portion of fluid flow flowing from reservoir 422 under the pressure gradient that flows to each of reservoirs 424. In implementations in which branches 442 each include an array of inertial pumps such as the array of the inertial pumps 334A-334D shown and described above with respect to system 320, actuator 438 may selectively actuate different inertial pumps 334 at different spacing's from their associated recipient reservoirs 424 as well as different numbers and/or combinations of such inertial pumps 334 to vary the rate of fluid flow from such inertial pumps to incrementally adjust the percentage or portion of fluid flowing from reservoir 422 under the pressure gradient to reservoir 424A and to reservoir 424B.

As shown by FIG. 7, in one implementation, microfluidic valve 420 may additionally comprise one or more complementary flow meters or sensors 449 that provide feedback to actuator 438 regarding the performance of microfluidic valve 420. In one implementation, following instructions provided in the non-transitory computer-readable medium, actuator 438 analyzes such feedback and adjusts operational parameters of inertial pumps 434 to better calibrate inertial pumps 434 to achieve desired control of fluid flow. For example, in one implementation, based on feedback from sensors 449, actuator 438 may adjust eight timing at which one inertial pump 434 is actuated or fired following pumping of fluid from reservoir 422 under the pressure gradient. In yet other implementations, flow meters or sensors 449 may be omitted.

FIGS. 8-13 illustrate microfluidic valve 520, an example implementation of microfluidic valve 20, in different operational states. Microfluidic valve 520 is similar to microfluidic valve 420 except that microfluidic valve 520 comprises three reservoirs 522A, 522B and 522C (collectively referred to as reservoirs 522) connected by channel 532, wherein a plurality of inertial pumps 534 is associated with each of reservoirs 522 serving as a source reservoir or as a recipient reservoir depending upon the operational state of microfluidic valve 520. The plurality of inertial pumps 53 are selectively actuatable by an actuator 438 (shown and described above with respect to system 420) to selectively control the flow of fluid from one of reservoirs 522 to a selected other of reservoirs 522.

Channel 532 is similar to channel 432. Channel 532 connects reservoirs 522 and comprises branches 542A, 542B and 542C (collectively referred to as branches 542) which are connected to one another at an intersection 544. Although illustrated as being at parallel or perpendicular to one another, branches 540 extend from one another at other angles.

In the example illustrated, system 520 comprises two selectively actuatable inertial pumps 534 proximate to an associated or assigned reservoir 522 and distant the remaining reservoirs 522. In the example illustrated, system 520 comprises inertial pumps 534A1, 534A2 proximate reservoir 522A, comprises inertial pumps 534B1, 534B2 proximate reservoir 522B and comprises inertial pumps 534C1, 534C2 proximate reservoir 522C. Each of inertial pumps 534 is independently actuatable by actuator 438 such that one of each pair of inertial pumps 534 may be actuated, such that both inertial pumps of a pair may be actuated or such that neither inertial pumps of a pair are actuated. In the example illustrated, each of inertial pumps 534, when fired, produces approximately the same pumping force to produce fluid flow at a rate equal to the rate of the other inertial pumps 534 when fired. In one implementation, each of inertial pumps 534 comprises a bubble jet pump comprising a micro-heater such as a TIJ thermal resistive element. In other implementations, inertial pumps 534 may comprise other types of inertial pumps such as inertial pumps having deflectable membranes such as PZT pumps.

Figure 8:
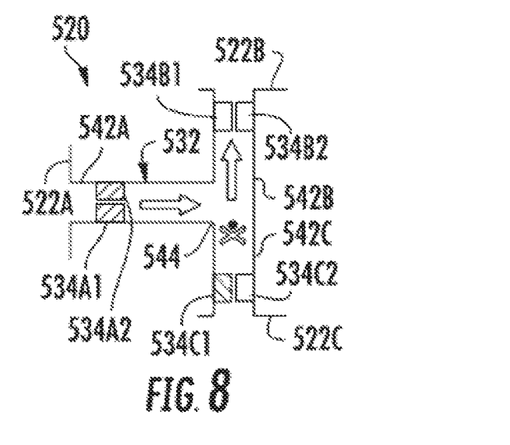
FIGS. 8-13 are schematic illustrations of another example microfluidic valve in different example operational states.

FIG. 8 illustrates microfluidic valve 520 in a first operational state in which fluid is pumps from reservoir 522A and is directed to reservoir 522B. In the example illustrated, actuator 438 (shown in FIG. 7) actuates or fires both of inertial pumps 534A1 and 534A2 to pump fluid from reservoir 522A. After a predefined time period following the actuation or firing of pumps 534A1 and 534A2, depending upon the length dimensions of channel 532, the viscosity of the fluid and the characteristics of pumps 534, actuator 438 actuates or fires inertial pump 534C1 while pumps 534C2 and 534B1, 534B2 remain inactive or off. In one implementation, in which fluid flowing through branch 542A, in the absence of actuation of pumps 534B and 534C, equally splits to branches 542B and 542C, the firing of inertial pump 534C1 produces ½ the fluid flow of the firing of inertial pumps 534A1 and 534A2, combined. As a result, fluid flow through branch 542C to reservoir 522C is substantially occluded or shut off (as represented by "X") such that the fluid from reservoir 522A flows through branch 542B into reservoir 522B.

Figure 9:
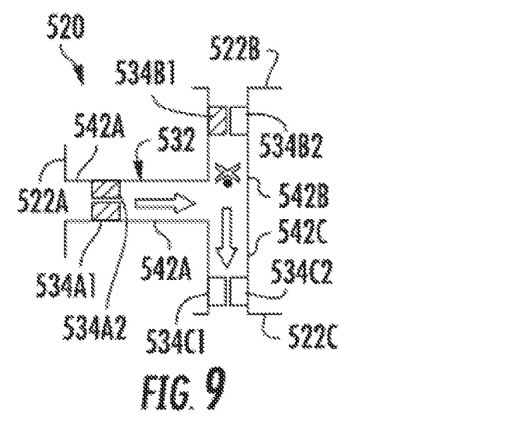

FIG. 9 illustrates microfluidic valve 520 in a second operational state in which fluid is pumped from reservoir 522A and is directed to reservoir 522C. In the example illustrated, actuator 438 (shown in FIG. 7) actuates or fires both of inertial pumps 534A1 and 534A2 to pump fluid from reservoir 522A. After a predefined time period following the actuation or firing of pumps 534A1 and 534A2, depending upon the length dimensions of channel 532, the viscosity of the fluid and the characteristics of pumps 534, actuator 438 actuates or fires inertial pump 534B1 while pumps 534B2 and 534C1, 534C2 remain inactive or off. In one implementation, in which fluid flowing through branch 542A, in the absence of actuation of pumps 534B and 534C, equally splits to branches 542B and 542 C, the firing of inertial pump 534B1 produces ½ the fluid flow of the firing of inertial pumps 534A1 and 534A2, combined. As a result, fluid flow through branch 542B to reservoir 522B is substantially occluded or shut off (as represented by "X") such that the fluid from reservoir 522A flows through branch 542C into reservoir 522C.

Figure 10:
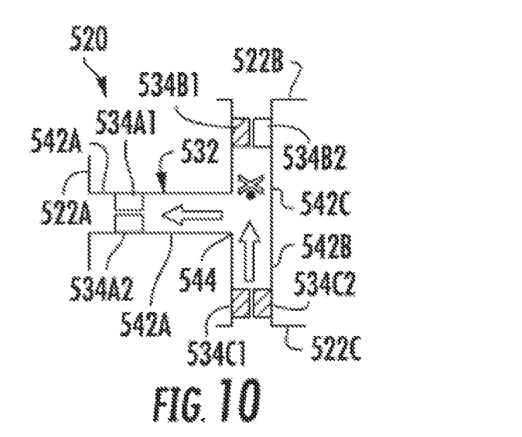

FIG. 10 illustrates microfluidic valve 520 in a third operational state in which fluid is pumps from reservoir 522C and is directed to reservoir 522A. In the example illustrated, actuator 438 (shown in FIG. 7) actuates or fires both of inertial pumps 534C1 and 534C2 to pump fluid from reservoir 522C. After a predefined time period following the actuation or firing of pumps 534C1 and 534C2, depending upon the length dimensions of channel 532, the viscosity of the fluid and the characteristics of pumps 534, actuator 438 actuates or fires inertial pump 534B1 while pumps 534B2 and 534A1, 534A2 remain inactive or off. In one implementation, in which fluid flowing through branch 542B, in the absence of actuation of pumps 534A and 534B, equally splits to branches 542A and 542B, the firing of inertial pump 534B1 produces ½ the fluid flow of the firing of inertial pumps 534C1 and 534C2, combined. As a result, fluid flow through branch 542B to reservoir 522B is substantially occluded or shut off (as represented by "X") such that the fluid from reservoir 522C flows through branch 542A into reservoir 522A.

Figure 11:
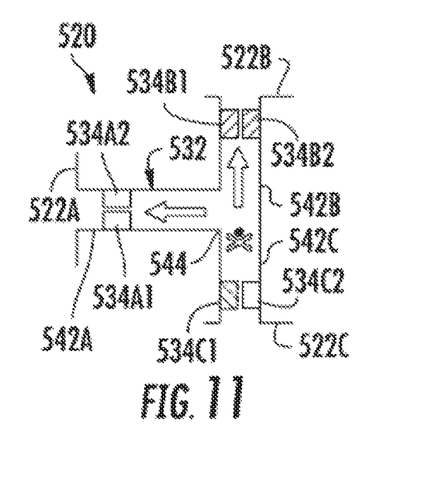

FIG. 11 illustrates microfluidic valve 520 in a fourth operational state in which fluid is pumped from reservoir 522B and is directed to reservoir 522A. In the example illustrated, actuator 438 (shown in FIG. 7) actuates or fires both of inertial pumps 534B1 and 534B2 to pump fluid from reservoir 522B. After a predefined time period following the actuation or firing of pumps 534B1 and 534B2 and depending upon the length dimensions of channel 532, the viscosity of the fluid and the characteristics of pumps 534, actuator 438 actuates or fires inertial pump 534C1 while pumps 534C2 and 534A1, 534A2 remain inactive or off. In one implementation, in which fluid flowing through branch 542B, in the absence of actuation of pumps 534A and 534C, equally splits to branches 542A and 542C, the firing of inertial pump 534C1 produces approximately ½ the fluid flow of the firing of inertial pumps 534B1 and 534B2, combined. As a result, fluid flow through branch 542C to reservoir 522C is substantially occluded or shut off (as represented by "X") such that the fluid from reservoir 522B flows through branch 542A into reservoir 522A.

Figure 12:
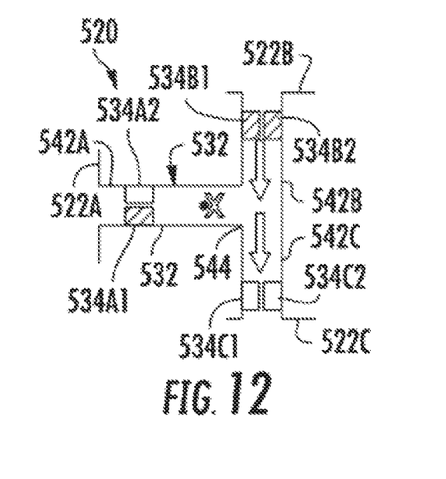

FIG. 12 illustrates microfluidic valve 520 in a fifth operational state in which fluid is pumped from reservoir 522B and is directed to reservoir 522C. In the example illustrated, actuator 438 (shown in FIG. 7) actuates or fires both of inertial pumps 534B1 and 534B2 to pump fluid from reservoir 522B. After a predefined time period following the actuation or firing of pumps 534B1 and 534B2, depending upon the length dimensions of channel 532, the viscosity of the fluid and the characteristics of pumps 534, actuator 438 actuates or fires inertial pump 534A1 while pumps 534A2 and 534C1, 534C2 remain inactive or off. In one implementation, in which fluid flowing through branch 542B, in the absence of actuation of pumps 534A and 534C, equally splits to branches 542A and 542C, the firing of inertial pump 534A1 produces approximately ½ the fluid flow of the firing of inertial pumps 534B1 and 534B2, combined. As a result, fluid flow through branch 542A to reservoir 522A is substantially occluded or shut off (as represented by "X") such that the fluid from reservoir 522B flows through branch 542C into reservoir 522C.

Figure 13:
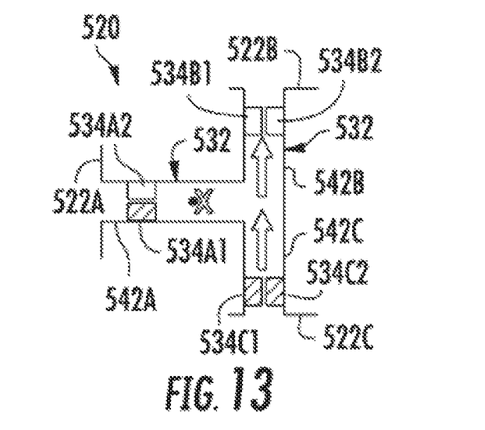

FIG. 13 illustrates microfluidic valve 520 in a six operational state in which fluid is pumped from reservoir 522C and is directed to reservoir 522B. In the example illustrated, actuator 438 (shown in FIG. 7) actuates or fires both of inertial pumps 534C1 and 534C2 to pump fluid from reservoir 522C. After a predefined time period following the actuation or firing of pumps 534C1 and 534C2 and depending upon the length dimensions of channel 532, the viscosity of the fluid and the characteristics of pumps 534, actuator 438 actuates or fires inertial pump 534A1 while pumps 534A2 and 534B1, 534B2 remain inactive or off. In one implementation, in which fluid flowing through branch 542C, in the absence of actuation of pumps 534A and 534B, equally splits to branches 542A and 542B, the The firing of inertial pump 534A1 produces approximately ½ the fluid flow of the firing of inertial pumps 534C1 and 534C2, combined. As a result, fluid flow through branch 542A to reservoir 522A is substantially occluded or shut off (as represented by "X") such that the fluid from reservoir 522C flows through branch 542B into reservoir 522B.

Although microfluidic valve 520 is illustrated as having a pair of inertial pumps 534 associate with each reservoir 522, in other implementations, microfluidic valve 520 may include a greater number of such inertial pumps associated with each reservoir 522. Although microfluidic valve 520 is illustrated as having inertial pumps 534 which are stacked in a direction orthogonal to branches 542, wherein the rate at which fluid is pumped is adjusted by adjusting the number of pumps 534 of each pair that are fired, in other implementations, pumps 534 may be stacked in a direction parallel to the branch 542 in which the pumps are located (similar to pumps 334 of system 320) such that the rate at which fluid is pumped by such pumps may additionally be adjusted by selectively firing inertial pumps 534 that are spaced from different distances from their associated reservoirs 522.

In each of the examples shown in FIGS. 8-13, in the absence of any resistant flow from the inertial pumps in the branches leading to the recipient reservoirs, the relative angles of the branches with respect to one another and the relatively equal sizes of such branches results in the fluid flowing from the source reservoir equally splitting between the two recipient reservoirs at intersection 544. To occlude fluid flow to one of the recipient reservoirs, the inertial pumps within the branch in which fluid flow is occluded produce a fluid flow rate that is one half the rate of fluid flow from the reservoir serving as the source of fluid. In some implementations, in the absence of any resistant flow from the inertial pumps in the branches leading to the recipient reservoirs, the fluid flowing from the source reservoir may not equally split at intersection 544, such as when the branches leading to the recipient reservoirs of different sizes and/or the angles at intersection 544 are not equal. In such circumstances, the inertial pumps in the branch being occluded may produce rate of fluid flow towards intersection 544 that is greater than or less than one half of the rate of fluid flow from source reservoir 522 to achieve such fluid flow occlusion. In some implementations, the resistant flow of the inertial pumps in the branches may alternatively be sized to reduce fluid flow to an associated reservoir rather than to occlude or completely block such fluid flow.

Figure 14:
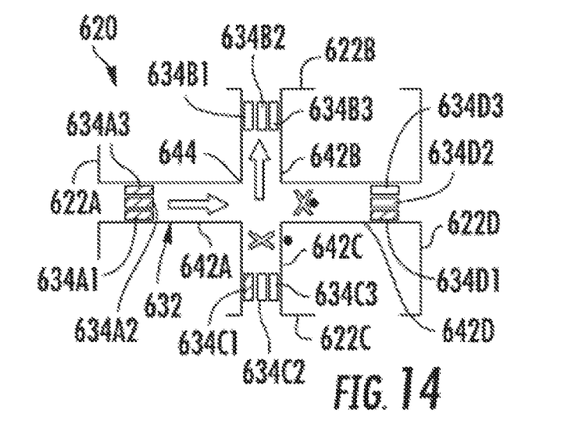
FIGS. 14 and 15 are schematic illustrations of another example microfluidic valve in different example operational states
Figure 15:
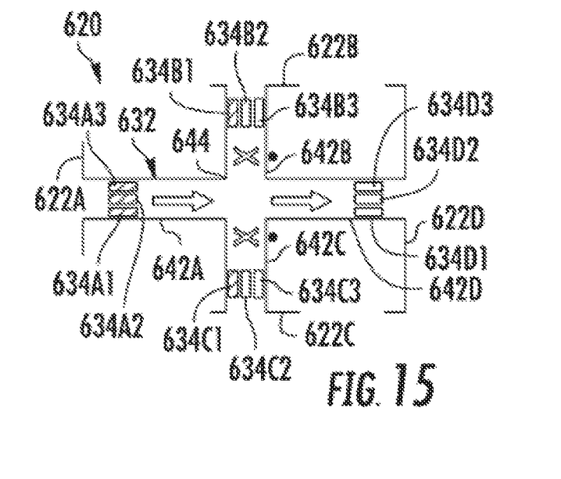

FIGS. 14 and 15 illustrate microfluidic valve 620, an example implementation of microfluidic valve 20, in different operational states. Microfluidic valve 620 is similar to microfluidic valve 620 except that valve microfluidic valve 620 comprises four reservoirs 622A, 622B, 622C and 622C (collectively referred to as reservoirs 622) connected by channel 632, wherein a plurality of inertial pumps 634 is associated with each of reservoirs 622 serving as a source reservoir or as a recipient reservoir depending upon the operational state of microfluidic valve 620. The plurality of inertial pumps 634 are selectively actuatable by an actuator 438 (shown and described above with respect to system 420) to selectively control the flow of fluid from one of reservoirs 622 to one or more other reservoirs 622.

Channel 632 is similar to channel 532. Channel 632 connects reservoirs 622 and comprises branches 640A, 640B, 640C and 640D (collectively referred to as branches 640) which are connected to one another at an intersection 644. Although illustrated as being parallel or perpendicular to one another, branches 640 may extend from one another at other angles.

In the example illustrated, system 620 comprises three selectively actuatable inertial pumps 634 proximate to each associated or assigned reservoir 622 and distant the remaining reservoirs 622. In the example illustrated, system 620 comprises inertial pumps 634A1, 634A2 proximate reservoir 622A, comprises inertial pumps 634B1, 634B2 proximate reservoir 622B, comprises inertial pumps 634C1, 634C2 proximate reservoir 622C and comprises inertial pumps 634D1, 634D2 proximate reservoir 622D. Each of inertial pumps 634 is independently actuatable by actuator 438 such that one or more inertial pumps of each set of inertial pumps 634 may be actuated, such that both actuators of a pair may be actuated or such that neither actuators of a pair are actuated. In the example illustrated, each of inertial pumps 634, when fired, produces approximately the same pumping force to produce fluid flow at a rate equal to the rate of the other inertial pumps 634 when fired. In one implementation, each of inertial pumps 634 comprises a bubble jet pump comprising a micro-heater such as a TIJ thermal resistive element. In other implementations, inertial pumps 634 may comprise other types of inertial pumps such as inertial pumps having deflectable membranes such as PZT pumps.

FIG. 14 illustrates microfluidic valve 620 in a first operational state in which fluid is pumps from reservoir 622A and is directed to reservoir 622B. In the example illustrated, actuator 438 (shown in FIG. 7) actuates or fires each of inertial pumps 634A1, 634A2 and 634A3 to pump fluid from reservoir 622A. After a predefined time period following the actuation or firing of pumps 634A1-634A3, depending upon the length dimensions of channel 632, the viscosity of the fluid and the characteristics of pumps 634, actuator 438 actuator fires inertial pumps 634C1 and 634D1 while pumps 634C2, 634C3 and each of inertial pumps 634B1-634B3 remain inactive or off. In one implementation, in which fluid flowing through branch 642A, in the absence of actuation of pumps 634B, 634C and 634D, equally splits to branches 642B, 642C and 642D, the firing of inertial pump 634C1 produces ⅓ of the fluid flow of the firing of inertial pumps 634A1-534A3, combined. As a result, fluid flow through branch 642C to reservoir 622C is substantially occluded or shut off (as represented by "X"). The firing of inertial pump 634D1 produces ⅓ of the fluid flow of the firing of inertial pumps 634A1-634A3, combined. As a result, fluid flow through branch 642D to reservoir 622D is substantially occluded or shut off (as represented by "X"). As a result, the fluid from reservoir 622A flows through branch 542B into reservoir 622B.

FIG. 15 illustrates microfluidic valve 620 in a second operational state in which fluid is pumps from reservoir 622A and is directed to reservoir 622D. In the example illustrated, actuator 438 (shown in FIG. 7) actuates or fires each of inertial pumps 634A1, 634A2 and 634A3 to pump fluid from reservoir 622A. After a predefined time period following the actuation or firing of pumps 634A1-634A3, depending upon the length dimensions of channel 632, the viscosity of the fluid and the characteristics of pumps 634, actuator 438 actuator fires inertial pumps 634B1 and 634C1 while pumps 634B2, 634B3, pumps 634C2, 634C3 and each of inertial pumps 634D1-634D3 remain inactive or off. In one implementation, in which fluid flowing through branch 642A, in the absence of actuation of pumps 634B, 634C and 634D, equally splits to branches 642B, 642C and 642D, the firing of inertial pump 634B1 produces ⅓ of the fluid flow of the firing of inertial pumps 634A1-634A3, combined. As a result, fluid flow through branch 642B to reservoir 622B is substantially occluded or shut off (as represented by "X"). The firing of inertial pump 634C1 produces ⅓ of the fluid flow of the firing of inertial pumps 634A1-634A3, combined. As a result, fluid flow through branch 642C to reservoir 622C is substantially occluded or shut off (as represented by "X"). As a result, the fluid from reservoir 622A flows through branch 642D into reservoir 622D. Microfluidic valve 620 may be operated in similar fashions to selectively direct fluid from a selected one of reservoirs 622 into another selected one of reservoirs 622. In a similar fashion, microfluidic valve 620 may be operated to selectively fire or actuate inertial pumps 634 to direct fluid from a selected one of reservoir 622 into each of the other of reservoirs 622 or a selected pair of reservoirs 622. In some implementations, microfluidic valve 620 may be operated to direct fluid from a pair of reservoirs or three of such reservoirs into one or two selected reservoirs by selectively actuating inertial pumps 634.

In each of the examples shown in FIGS. 14 and 15, in the absence of any resistant flow from the inertial pumps in the branches leading to the recipient reservoirs, the relative angles of the branches with respect to one another and the relatively equal sizes of such branches results in the fluid flowing from the source reservoir equally splitting between the three recipient reservoirs at intersection 644. To occlude fluid flow to two of the recipient reservoirs, the inertial pumps within the branches in which fluid flow is occluded produce a fluid flow rate that is one third the rate of fluid flow from the reservoir serving as the source of fluid. In other implementations in which there are n potential recipient reservoirs to receive fluid from a source reservoir and in which fluid flow from the source reservoir equally splits amongst the different branches at the intersection in the absence of any resistant flows, fluid flow is directed to a particular one of the potential recipient reservoirs by actuating the inertial pumps in the individual branches leading to the recipient reservoirs so as to produce a resistant flow that is 1/n of the fluid flow rate from the source reservoir.

In some implementations, in the absence of any resistant flow from the inertial pumps in the branches leading to the recipient reservoirs, the fluid flowing from the source reservoir may not equally split at the intersection, such as at intersection 644. This unequal splitting a fluid flow at the intersection may result when the branches leading to the recipient reservoirs have different sizes and/or the angles at intersection 644 are not equal. In such circumstances, the inertial pumps in the branch being occluded may produce rate of fluid flow towards intersection 644 that is greater than or less than 1/n of the rate of fluid flow from the source reservoir to achieve such fluid flow occlusion. In some implementations, the resistant flow of the inertial pumps in the branches may alternatively be sized to reduce fluid flow to an associated reservoir rather than to occlude or completely block such fluid flow.

Although microfluidic valve 620 is illustrated as having a set of three inertial pumps 634 associated with each reservoir 622, in other implementations, microfluidic valve 620 may include a greater number of such inertial pumps associated with each reservoir 622. Although microfluidic valve 620 is illustrated as having inertial pumps 634 which are stacked in a direction orthogonal to branches 642, wherein the rate at which fluid is pumped is adjusted by adjusting the number of pumps 634 of each facet that are fired, in other implementations, pumps 634 may be stacked in a direction parallel to the branch 642 in which the pumps are located (similar to pumps 334 of system 320) such that the rate at which fluid is pumped by such pumps may additionally be adjusted by selectively firing inertial pumps 634 that are spaced from different distances from their associated reservoirs 622.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A microfluidic valve comprising:
   a first reservoir;
   a second reservoir;
   a channel connecting the first reservoir to the second reservoir, wherein the second reservoir is to receive fluid from the first reservoir through the channel under a pressure gradient from the first reservoir to the second reservoir in the channel, the pressure gradient to drive a first flow of the fluid into the channel from the first reservoir to the second reservoir; and
   an inertial pump within the channel proximate the second reservoir and distant the first reservoir the inertial pump to drive a second flow of the fluid from the second reservoir to the first reservoir in the channel that opposes the first flow caused by the pressure gradient in the channel, and to thereby operate as a microfluidic valve and to control fluid flow between the first reservoir and second reservoir in the channel to:
      occlude the first flow of the fluid from the first reservoir to the second reservoir; or
      reduce a rate of the first flow of the fluid caused by the pressure gradient from the first reservoir to the second reservoir.

2. The valve of claim 1, wherein the inertial pump comprises a bubble jet pump to generate a bubble that pushes the fluid in the channel toward each end of the channel and thereby cause the second flow of the fluid that opposes the first flow of the fluid caused by pressure gradient.

3. The valve of claim 1 further comprising an actuator to selectively vary a spacing of the inertial pump from the second reservoir and wherein the inertial pump is distant from an input of the first flow of the fluid into the channel from the first reservoir to the second reservoir.

4. The valve of claim 1 further comprising:
   a second inertial pump within the channel proximate the second reservoir and distant the first reservoir; and
   an actuator to selectively actuate the inertial pump and the second inertial pump to generate the second flow of the fluid that opposes the first flow of the fluid.

5. The valve of claim 4 comprising an array of independently actuatable firing resistors forming the inertial pump and the second inertial pump, wherein the firing resistors of the array are differently spaced from the second reservoir.

6. The valve of claim 1 comprising an array of independently actuatable firing resistors forming the inertial pump, the resistors of the array being equally spaced from the second reservoir, wherein the actuator comprises a controller to selectively fire the resistors to varying number of the resistors that are actuated to vary a pumping force.

7. The valve of claim 1 further comprising an actuator to selectively vary a pumping force of the inertial pump at a given location.

8. The valve of claim 1, wherein the channel comprises:
   a first branch;
   a second branch extending from an intersection with the first branch; and
   a third branch extending from the intersection and connected to a third reservoir.

9. The valve of claim 8 further comprising an actuator to selectively vary one of a pumping force of the inertial pump at a given location and a location of the inertial pump.

10. The valve of claim 8 further comprising:
a second inertial pump within the third branch proximate the third reservoir and distant the intersection; and
an actuator to independently vary pumping of the inertial pump and the second inertial pump.

11. The valve of claim 10 further comprising a third inertial pump within the first branch, wherein the actuator is to independently vary pumping of the first inertial pump, the second inertial pump and the third inertial pump.

12. The valve of claim 1, wherein the second reservoir has a cross-sectional area at a junction of the second reservoir and the channel of at least 10 times a cross-sectional area of the channel at the junction, and further comprising a pump coupled to the channel to generate the pressure gradient and drive the first flow of the fluid.

13. The microfluidic valve of claim 1 further comprising:
a third reservoir, wherein the channel comprises a first branch extending from the first reservoir, a second branch extending from the second reservoir and a third branch extending from the third reservoir, the first branch, second branch and the third branch connecting at an intersection;
a second inertial pump, wherein the inertial pump and the second inertial pump are within the second branch proximate the second reservoir and distant the intersection;
a third inertial pump and a fourth inertial pump, wherein the third inertial pump and the fourth inertial pump are within the first branch proximate the first reservoir and distant the intersection;
a fifth inertial pump and a sixth inertial pump, wherein the fifth inertial pump and the sixth inertial pump are within the third branch proximate the third reservoir and distant the intersection; and
an actuator to selectively activate the first inertial pump, a second inertial pump, the third inertial pump, the fifth inertial pump and the sixth inertial pump to control fluid flow to and from each of the first reservoir, a second reservoir and the third reservoir.

14. The microfluidic valve of claim 13, wherein the inertial pump and the second inertial pump are equally spaced from the second reservoir, wherein the third inertial pump and the fourth inertial pump are equally spaced from the first reservoir and wherein the fifth inertial pump and the sixth inertial pump are equally spaced from the third reservoir.

15. The microfluidic valve of claim 13 further comprising:
a fourth reservoir, where the channel comprises a fourth branch extending from the fourth reservoir and connected to the intersection; and
a seventh inertial pump and an eighth inertial pump within the fourth branch proximate the fourth reservoir and distant the intersection, wherein the actuator is further to selectively actuate the seventh inertial pump and the eighth inertial pump to control fluid flow to it from the fourth reservoir.

16. The microfluidic valve of claim 1 further comprising a second inertial pump in the channel proximate the first reservoir and distant the second reservoir to pump fluid towards the second reservoir which forms the pressure gradient, the inertial pump to drive the second flow of the fluid that occludes the first flow of the fluid from the first reservoir to the second reservoir.

17. A microfluidic valving method comprising:
applying a pressure gradient from a first reservoir to a second reservoir to bias a first fluid flow from the first reservoir to the second reservoir through a channel connecting the first reservoir to the second reservoir, the pressure gradient being in the channel and driving the first fluid flow; and
selectively actuating an inertial pump within the channel proximate the second reservoir and distant the first reservoir, and thereby, generating a second fluid flow from the second reservoir to the first reservoir in the channel that opposes the first fluid flow in the channel caused by the pressure gradient, so as to control the fluid flow, the inertial pump to drive the second fluid flow from the second reservoir to the first reservoir in the channel to:
occlude the first fluid flow from first reservoir to the second reservoir; or
reduce a rate of the first fluid flow caused by the pressure gradient from the first reservoir to the second reservoir.

18. The method of claim 17 comprising selectively varying one of a pumping force of the inertial pump at a given location and a location of the inertial pump to control the fluid flow, wherein the inertial pump is distant from an input of the first fluid flow into the channel from the first reservoir to the second reservoir, and wherein selectively actuating the inertial pump further includes generating a bubble that pushes the fluid in the channel toward each end of the channel, and causes the second fluid flow that opposes the first fluid flow causes by the pressure gradient.

19. A microfluidic valve comprising:
a first reservoir;
a second reservoir;
a third reservoir;
a channel comprising a first branch extending from the first reservoir, a second branch extending from an intersection with the first branch to the second reservoir and a third branch extending from the intersection to the third reservoir, wherein the second reservoir and the third reservoir are to selectively receive fluid from the first reservoir through the channel under a pressure gradient from the first reservoir to the second reservoir and the third reservoir in the channel, the pressure gradient to drive a first flow of the fluid into the second branch from the first reservoir to the second reservoir and to drive a second flow of the fluid into the third branch from the first reservoir to the third reservoir;
a first bubble jet pump within the second branch proximate the second reservoir and distant the intersection, the first bubble jet pump to drive a third flow of the fluid from the second reservoir to the first reservoir in the channel that opposes the first flow of the fluid caused by the pressure gradient in the channel to:
occlude the first flow of the fluid from the first reservoir to the second reservoir in the channel; or
reduce a rate of the first flow of the fluid caused by the pressure gradient from the first reservoir to the second reservoir in the channel;
a second bubble jet pump within the third branch proximate the third reservoir and distant the intersection, the second bubble jet pump to drive a fourth flow of the fluid from the third reservoir to the first reservoir in the channel that opposes the second flow of the fluid caused by the pressure gradient in the channel to:

occlude the second flow of the fluid from the first reservoir to the third reservoir in the channel; or reduce a respective rate of the second flow of the fluid caused by the pressure gradient from the first reservoir to the third reservoir in the channel; and an actuator to independently vary pumping of the first bubble jet pump and the second bubble jet pump to generate the third flow and the fourth flow of the fluid that respectively oppose the first flow and the second flow of the fluid to control fluid flow to the second reservoir and the third reservoir.

20. The microfluidic valve of claim 19 further comprising:

a sensor to sense the flow of fluid within the channel, the sensor located adjacent the first reservoir; and the actuator to:

adjust an operational parameter of the first and second first bubble jet pumps based upon signals from the sensor; and selectively activate:

the first bubble jet disposed within the second branch distant an input of the first flow of the fluid into the second branch caused by the pressure gradient, the first bubble jet to generate a first bubble that pushes the fluid in the second branch toward each end of the second branch, and causes the third flow of the fluid that opposes the first flow of the fluid caused by the pressure gradient; and the second bubble jet disposed within the third branch distant an input of the second flow of the fluid into the third branch caused by the pressure gradient, the second bubble jet to generate a second bubble that pushes the fluid in the third branch toward each end of the third branch, and causes the fourth flow of the fluid that opposes the second flow of the fluid caused by the pressure gradient.

* * * * *